Patented Jan. 27, 1953

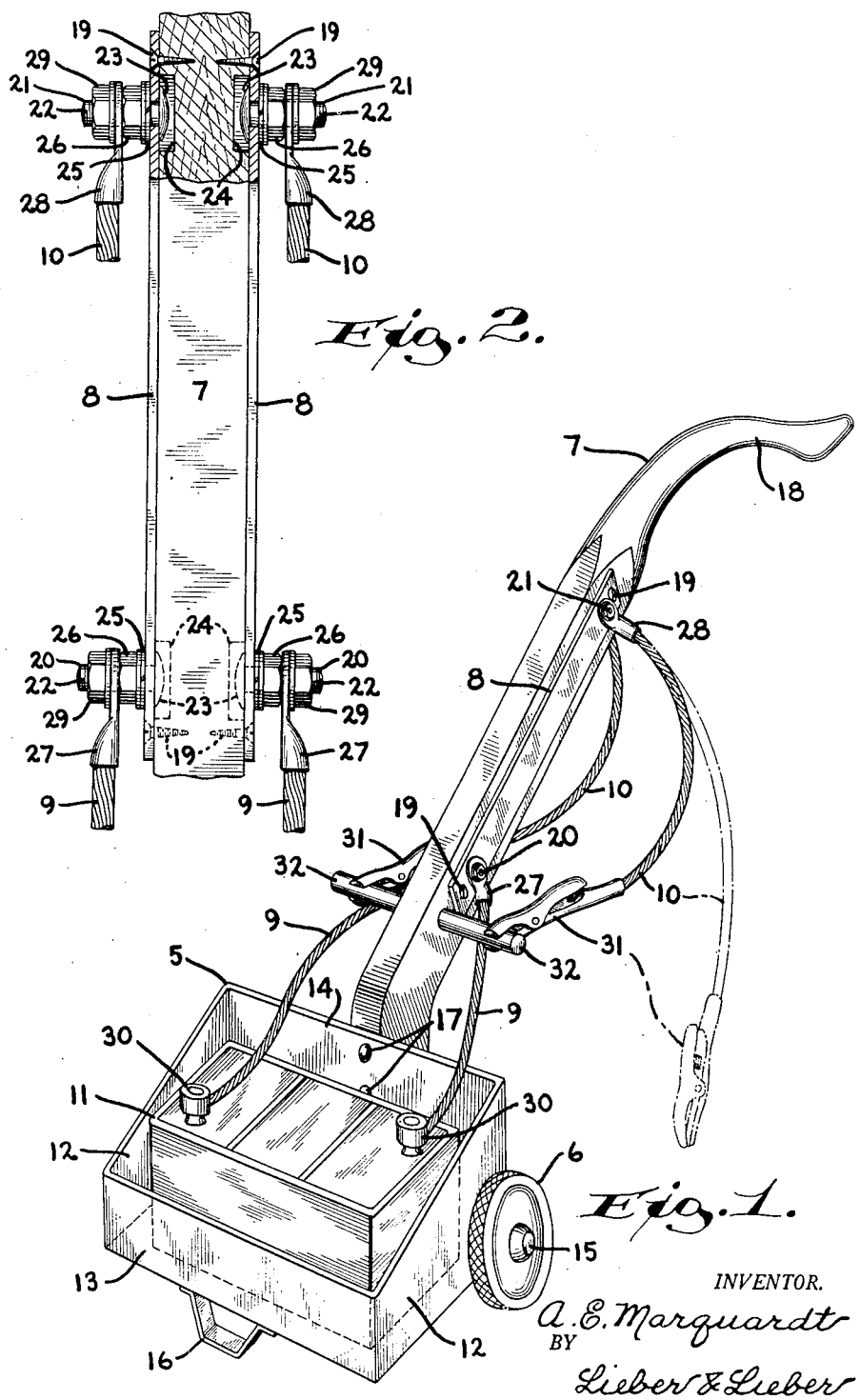

2,626,972

UNITED STATES PATENT OFFICE 2,626,972

STORAGE BATTERY TRANSPORTING CART

Alfred E. Marquardt, Oconto Falls, Wis.

Application September 20, 1950, Serial No. 185,735

1 Claim. (Cl. 136—181)

My present invention relates generally to improvements in the art of transporting and utilizing storage batteries, and relates more particularly to improvements in the construction and operation of wheeled battery carts having current conducting means associated therewith.

A primary object of the present invention is to provide an improved new and useful battery transporting cart which is extremely simple, durable and compact in construction and which is moreover highly efficient and practical in operation.

In the garage business, it is frequently necessary to start automobiles and trucks or the like, having "dead" batteries which may be caused by one reason or another. In some cases, the stalled vehicle is right in the garage or repair shop; and in others, it may be at some remote point as in a street or parking lot which requires a service call. Likewise, it is common practice in the used car business to have to start automobiles and trucks which have been standing for varying periods of time on the used car lot and either having no battery at all or a battery which does not have sufficient energy left to start the engine. In such cases, it has long been customary to either push or tow the vehicle to effect starting or to actually install a good battery therein. In towing or pushing the car, two persons are required, one for each vehicle; and even with the exercise of extreme care, damage is sometimes caused to the bumper or fenders of one or the other of the vehicles or to the transmission gears of the car being started. When a good battery is installed for starting purposes, considerable time and effort by the mechanic is required in first removing the old battery and thereafter carrying a new heavy battery to the vehicle, lifting the same over the car or truck fender for positioning under the hood, and finally connecting and clamping the battery in place in the confined quarters.

It is therefore a more specific object of my present invention to provide an improved storage battery transporting cart which obviates all of the disadvantages and objections heretofore present in prior methods and practices of starting vehicles stalled by reason of battery trouble.

Another specific object of the invention is to provide an improved wheeled battery cart by means which a storage battery may be readily transported by one person to a stalled vehicle and quickly and easily operatively connected to the engine without any need whatsoever of either removing the old battery from the vehicle or lifting the good battery from its carrying position in the cart.

Another specific object of this invention is to provide an improved storage battery transporting and vehicle starting device which is extremely maneuverable and flexible in its adaptations, and which comprises relatively few parts capable of ready assembly and dismantling with the aid of ordinary tools.

Another specific object of my invention is to provide an improved new and useful wheeled battery transporting device which is adapted for use in garages, repair shops, and used car lots for facilitating engine starting with minimum effort by unskilled persons, and which may furthermore be produced in large quantities at low cost from available materials.

An additional specific object of my present invention is to provide an improved wheel supported battery transporting cart which possesses a high degree of stability and balance and is readily manipulable by a single person over various types of terrain, and which moreover embodies simple and novel current conducting means adapted to be quickly and easily connected to the starting circuit in a battery started vehicle.

A further specific object of the present invention is to provide an improved battery transporting and engine starting device which may be manipulated with maximum safety to the user, and in which the manipulating handle is provided with insulated current conducting means adapted to reduce the required cable length to a minimum without detrimentally affecting either the efficiency of the unit or the flexibility thereof.

Still another specific object of the present invention is to provide a battery cart comprising, a battery receiving and supporting member, transporting wheels associated with the member, a manipulating handle formed of insulating material and projecting upwardly from the member, and a pair of elongated current conducting elements secured to the handle in spaced relationship, each of the elements having flexible conductors at opposite ends thereof adapted to be connected respectively to a battery carried by the receiving and supporting member and to the starting circuit of an internal combustion engine.

These and other specific objects and advantages of the invention will be apparent from the following detailed description.

A clear conception of the several features constituting the present improvement, and of the mode of constructing and of utilizing storage battery transporting carts embodying the invention, may be had by referring to the drawing accompanying and forming a part of this specification, wherein like reference characters designate the same or similar parts in the two views.

Fig. 1 is a front and side perspective view of a typical battery transporting and engine starting device embodying the invention and showing the lower flexible conductors secured to the terminals of a typical battery seated within the supporting tray and the upper flexible conductors inoperatively clamped to the insulated receiving posts, one of the upper conductors being illustrated as disengaged from its post in dot-and-dash lines; and Fig. 2 is a fragmentary part sectional view of the insulated handle and elongated current conducting elements associated therewith.

While the invention has been shown and described herein as being embodied in a two-wheeled cart provided with a particular type of battery receiving and supporting tray having a single manipulating handle projecting upwardly at an angle therefrom and adapted for use with a particular type of storage battery in starting internal combustion engines of automobiles or trucks, it is not desired or intended to unnecessarily restrict or limit the scope or utility of the improvement by reason of such specific embodiment, and it is also contemplated that certain descriptive terms used herein be given the broadest possible interpretation consistent with the disclosure.

Referring to the drawing, the improved battery cart comprises, in general, a battery receiving and supporting member 5 having transporting wheels 6 associated therewith; a manipulating handle 7 formed of a suitable insulating material such as wood projecting upwardly from the member 5; and a pair of elongated current conducting elements 8 secured to the handle 7 in spaced relationship, each of the elements 8 being provided with flexible conductors or cables 9, 10 at opposite ends thereof adapted to be connected respectively to a battery 11 carried by the member 5 and to an internal combustion engine, not shown.

The member 5 may be conveniently formed of sheet metal or other suitable sheet material and is preferably in the nature of a rectangular tray or the like having end walls 12 and front and rear walls 13, 14 respectively within which the battery 11 is confined. The wheels 6 may be of the ordinary disc type provided with pneumatic or semi-pneumatic tires and journalled for rotation at opposite ends of an axle 15 carried by the member 5 near the rear wall 14 thereof, and a depending leg 16 of any suitable construction is preferably provided for the member 5 near the front wall 13 thereof to support the member 5 in cooperation with the wheels 6 when the cart is at rest as shown in Fig. 1. While the handle 7 is shown as being formed of a single elongated piece of wood having rectangular cross-section, it may obviously be formed of other suitable materials and of any desired shape; and it is conveniently detachably secured at its lower end to the rear wall 14 of the member 5 by means of bolts 17 or the like and projects upwardly and rearwardly from the member 5 at an angle as shown, terminating at the upper end in a gripping portion 18. The elongated conducting elements 8 are preferably in the form of metal plates which may be independently secured to the handle 7 intermediate the ends thereof by means of screws 19 or the like, the plates 8 being disposed longitudinally of the handle 7 and preferably, but not necessarily, on opposite sides thereof. To provide means for securing the flexible conductors 9, 10 to the elements or plates 8, each of these plates is provided with a lower projection or post 20 and an upper projection or post 21; and as shown in detail in Fig. 2 each of the projections or terminal posts 20, 21 are identical and preferably comprise an outwardly projecting threaded shank 22 having an end head 23 coacting with the adjacent plate 8 and embedded within a recess 24 in the handle 7, with a lock washer 25 and nut 26 being secured on the shank 22 of each terminal post so as to maintain the same securely in position on the respective plate 8. One end of each of the flexible cables or conductors 9, 10 is provided with a suitable terminal connector 27, 28 respectively adapted for reception on the shank 22 of its respective terminal post and is finally secured thereto by means of a suitable nut 29 having threaded coaction with the shank 22; and the opposite free end of each of the conductors 9 is provided with the usual battery terminal clamp or connector 30 while the free end of each of the conductors 10 is provided with a suitable clamp or clip 31 adapted for attachment to the battery or starting circuit of an internal combustion engine in a well known manner. To maintain the flexible conductors 10 in a neat and orderly manner during non-use of the improved device, means are provided on the handle for receiving the free ends of the conductors, and such means is shown as consisting of a projection or post 32 on each of the opposite sides of the handle 7 below the elements or plates 8 for receiving the clamps 31 of the conductors, the projections 32 being also formed of insulating material or being insulated from each other and from the plates 8 for obvious reasons.

After the flexible conductors 9 have been secured to their respective lower terminals 20 of the conductor plates 8 in an obvious manner and the flexible conductors 10 have likewise been secured to their respective upper terminals 21 of the plates 8 in like manner with the aid of the nuts 29, a suitable storage battery 11 may be placed within the tray member 5 and the free ends of the conductors 9 clamped to the proper battery terminals with the aid of the terminal clamps 30 in a known manner. The cart is then ready for operation, and when it is desired to utilize the battery 11 in facilitating the starting of an automobile or the like, it is only necessary to tilt the cart rearwardly on its wheels 6 with the aid of the handle 7 and push or pull the same to the stalled vehicle and to thereafter clamp the free ends of the conductors 10 to the battery or starting circuit of the engine with the aid of the clamps 31, whereupon the engine may be started in the usual manner with the aid of the ignition switch and starter. After the battery 11 has served its purpose, the clamps 30 may be readily removed from the starting circuit of the engine and clamped to the respective projections 32, as shown by full lines in Fig. 1, so as to prevent tangling and knotting of the conductors 10, and the battery may remain in the tray 5 with the conductors 9 attached thereto for re-use.

From the foregoing detailed description, it is believed apparent that the present invention provides an improved battery transporting cart and engine starting device which is extremely simple, compact and durable in construction as well as highly efficient and flexible in use and economical in both initial cost and upkeep. The various parts of the unit may be readily constructed of any suitable materials, and may be quickly and easily assembled as well as dismantled with the aid of ordinary tools. By constructing the handle 7 of wood or other insulating material and separately securing the conductor plates 8 thereto, the circuits are insulated from each other, thereby insuring maximum safety in operation; and once the battery 11 has been placed in the tray 5 and properly connected, it is not necessary to thereafter lift the same since the current is conducted therefrom to the desired point through the respective flexible conductors 9, conductor plates 8, and flexible conductors 10. The provision of the rigid conductor elements or plates 8 on the handle provides a simple and compact assemblage whereby a considerable length of cable or conductor wire is eliminated and the clamp receiving projections 32 provide a convenient means for maintaining the flexible conductors in neat order at all times of non-use of the device. It is also contemplated that the manipulating means 7 may consist of a pair of upwardly projecting members insulated from each other for use also as the electrical conductors; and in either case, the handle or manipulating means, whether the same comprises one or two uprights 7, may serve the dual purpose of facilitating movement of the device and conducting the electrical current. Battery carts constructed in accordance with the invention have, in fact, proven highly satisfactory and successful in actual use, and are capable of being handled by a novice particularly to facilitate starting of cars in used car lots to thereby promote sales of the same.

It should be understood that it is not desired to limit this invention to the exact details of construction or to the precise mode of use and operation herein shown and described, since various modifications within the scope of the appended claim may occur to persons skilled in the art to which this invention pertains.

I claim:

A battery transporting and engine starting cart comprising, a battery receiving and supporting member, transporting wheels associated with said member, a manipulating handle formed of insulating material secured at its lower end to and projecting upwardly from said member, said handle terminating in an upper gripping portion, a pair of rigid elongated current conducting plates independently secured to an intermediate portion of said handle between and spaced from said battery receiving member and said gripping portion and extending longitudinally on opposite sides of said handle in insulated relationship to each other, each of said plates having flexible conductors secured thereto at the extreme lower and upper ends thereof, said lower conductors being adapted for connection to a battery carried by said member and said upper conductors being of at least the same length as said plates and being adapted for connection to an internal combustion engine, and laterally projecting pins of insulating material carried by said handle below and beyond said rigid connecting plates and in insulated relationship thereto for receiving the free ends of said upper flexible connectors when they are not in use.

ALFRED E. MARQUARDT.

REFERENCES CITED

The following references are of record in the file of this patent:

UNITED STATES PATENTS

| Number | Name | Date |
| --- | --- | --- |
| D. 151,008 | Rycraft | Sept. 14, 1948 |
| 1,681,944 | Marshall, Jr. | Aug. 28, 1928 |
| 1,751,902 | Brown | Mar. 25, 1930 |
| 1,970,091 | Heyer | Aug. 14, 1934 |
| 2,409,786 | Norton | Oct. 22, 1946 |
| 2,425,107 | Martin | Aug. 5, 1947 |

OTHER REFERENCES

Popular Science, December 1946, page 138.